H. H. Craigie,
Waste-Water Trap.

N° 89,858. Patented May 11, 1869.

Witnesses  Inventor

United States Patent Office.

HUGH H. CRAIGIE, OF NEW YORK, N. Y.

Letters Patent No. 89,858, dated May 11, 1869.

IMPROVEMENT IN WASTE-TRAPS FOR WASH-BASINS.

The Schedule referred to in these Letters Patent and making part of the same.

*To all whom it may concern:*

Be it known that I, HUGH H. CRAIGIE, of the city and State of New York, have invented, made, and applied to use a certain new and useful Improvement in Traps for Stationary Wash-Basins, &c.; and I do hereby declare the following to be a full, clear, and exact description of the construction and operation of the same, reference being had to the annexed drawing, making part of this specification, wherein—

Figure 3 is a vertical section of the trap, in the form adapted to that class of basins in which the overflow-pipe is made in the basin itself.

Similar marks of reference denote the same parts.

Figure 1:
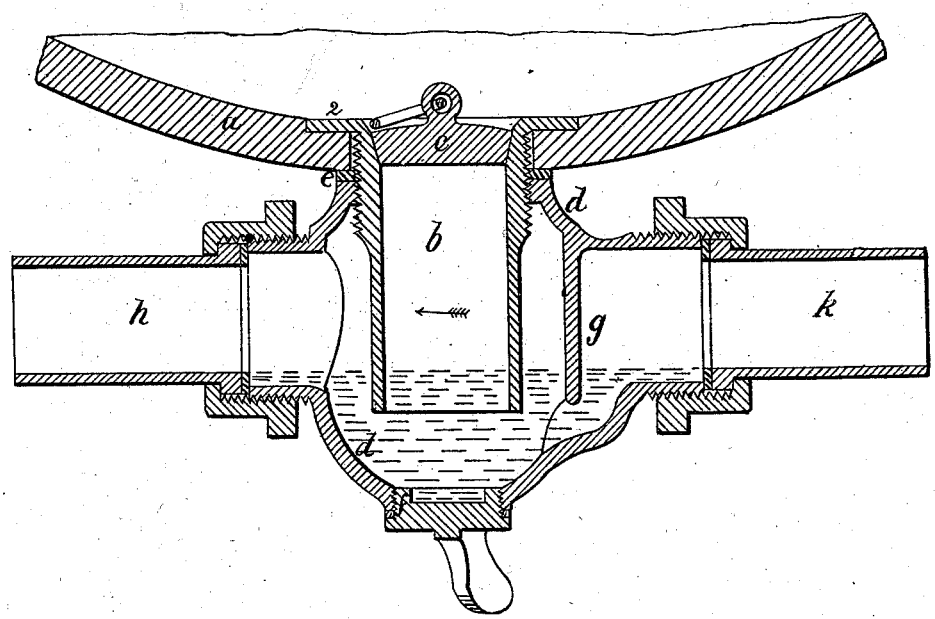
Figure 1 is a vertical section of my improved trap, as applied to the bottom of an ordinary stationary basin.

In stationary basins, it has heretofore been usual to have a brass ferrule in the bottom of the basin, for receiving the plug, and in which ferrule are cross-bars, to prevent large substances passing into the pipe for the waste water.

These cross-bars catch and detain hairs, lint, &c., that accumulate and stop the free escape of water, while matches, hair-pins, and similar articles may pass into the pipe and choke the same. This former character of ferrule allowed small valuable articles, accidentally left in the basin, to escape and be lost in the waste-pipe.

The object of my invention is to remove these difficulties by allowing the free escape of such articles as will be readily washed away, such as lint, &c., and at the same time detaining permanent obstructions, such as matches, &c., and also catching small valuable articles, such as rings, pins, &c., that might be in the basin, and accidentally allowed to pass into the waste-pipe.

My invention consists of a metal trap, screwed upon the ferrule of the basin, and forming a nut, to clamp said ferrule to its place, and the ferrule and trap acting together, to exclude smell from the waste-pipe, and retain any substances that might obstruct the waste-pipe if allowed to pass into the same.

In the drawing, *a* represents a portion of the stationary wash-basin, with an opening in the bottom, as usual, through which passes the ferrule *b*, having a flange, 2, as usual, and adapted to receive the plug *c*.

On the outside of the ferrule *b* is a screw-thread, upon which the trap *d* is screwed, so that the basin is clamped and the parts rendered water-tight by the washer *e*.

At the lower part of the trap is a screw, *f*, that can be taken out, for removing any substances that may remain in the trap, and the stop-plate, at *g*, passing down below the surface of the water that remains in the trap, prevents smell passing into the basin from the escape or waste-pipe *h*, that is coupled or otherwise connected to the trap *d*.

Figure 2:
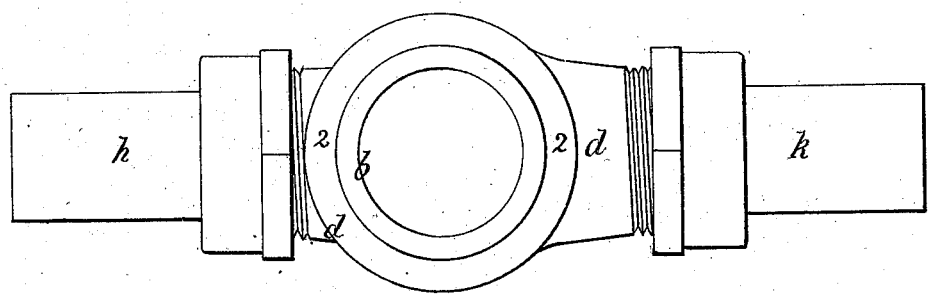
Figure 2 is a plan of the trap.

In cases where the basin is provided with a horn for receiving the overflow-pipe, the same is to be connected with the coupling, *k*, figs. 1 and 2, but, when the basin itself is formed with the overflow *i*, as shown in fig. 3, the ferrule *b* is to have openings through its sides communicating with said overflow-pipe *i*.

It will now be seen that the water is retained sufficiently to trap smell, a free escape is provided for small floating particles that will not obstruct the pipe, solid substances are detained, and the trap can be cleaned out with great facility.

If desired, cross-bars or a movable strainer might be introduced in the ferrule *b* below the plug. A set-nut might intervene between the trap and basin upon the ferrule *b*, but it is not necessary.

By connecting the waste-pipe to the trap by means of couplings, the parts can be disconnected with facility for repairs if required. This trap might be applied to a pantry-sink or similar article containing the ferrule and plug.

What I claim, and desire to secure by Letters Patent, is—

1. The trap *d*, screwed upon the ferrule *b*, and acting as a nut to clamp the ferrule *b* and washer to the basin, substantially as set forth.

2. The ferrule *b*, trap *d*, stop-plate *g*, and trap-screw *f*, the parts being combined and arranged substantially as set forth.

3. The ferrule *b* and plug *c*, in combination with the trap *d*, connected directly to said ferrule *b*, substantially as set forth.

4. The trap *d*, intervening between the screw-coupling of the waste-pipe and the ferrule and plug of the basin or sink.

In witness whereof, I have hereunto set my signature, this 11th day of December, 1868.

H. H. CRAIGIE.

Witnesses:
CHAS. H. SMITH,
GEO. T. PINCKNEY.